United States Patent
Katipally et al.

(10) Patent No.: US 9,300,408 B2
(45) Date of Patent: Mar. 29, 2016

(54) METHODS AND SYSTEMS FOR CALIBRATING LTE ANTENNA SYSTEMS

(71) Applicant: Radio Frequency Systems, Inc., Meriden, CT (US)

(72) Inventors: Raja Reddy Katipally, Cheshire, CT (US); Jari Taskila, Meriden, CT (US); Aaron Rose, Hamden, CT (US)

(73) Assignee: ALCATEL-LUCENT SHANGHAI BELL CO., LTD, Shanghai (CN)

( * ) Notice: Subject to any disclaimer, the term of this patent is extended or adjusted under 35 U.S.C. 154(b) by 207 days.

(21) Appl. No.: 14/071,263

(22) Filed: Nov. 4, 2013

(65) Prior Publication Data

US 2015/0126135 A1 May 7, 2015

(51) Int. Cl.
| | |
|---|---|
| *H01Q 3/26* | (2006.01) |
| *H01Q 25/00* | (2006.01) |
| *H01Q 19/17* | (2006.01) |
| *H01Q 3/40* | (2006.01) |
| *H04B 17/00* | (2015.01) |
| *H04B 17/11* | (2015.01) |
| *H04B 5/00* | (2006.01) |
| *H04B 17/12* | (2015.01) |
| *H04B 17/14* | (2015.01) |

(52) U.S. Cl.
CPC ............... *H04B 17/00* (2013.01); *H01Q 3/267* (2013.01); *H04B 17/11* (2015.01); *H04B 5/0012* (2013.01); *H04B 17/12* (2015.01); *H04B 17/14* (2015.01)

(58) Field of Classification Search
CPC .... H04B 17/00; H04B 17/12; H04B 17/0085; H01Q 3/267; H01Q 3/26; H01Q 3/40; H01Q 19/17; H01Q 25/007; G01S 7/40
See application file for complete search history.

(56) References Cited

U.S. PATENT DOCUMENTS

| | | | | |
|---|---|---|---|---|
| 5,412,414 | A * | 5/1995 | Ast et al. .................... | 342/174 |
| 5,644,316 | A | 7/1997 | Lewis et al. | |
| 5,784,030 | A * | 7/1998 | Lane et al. .................. | 342/373 |
| 6,157,343 | A * | 12/2000 | Andersson et al. .......... | 342/371 |
| 6,356,233 | B1 * | 3/2002 | Miller et al. ................. | 342/368 |
| 6,809,685 | B2 * | 10/2004 | Hancock ...................... | 342/368 |
| 7,068,218 | B2 * | 6/2006 | Gottl et al. ................... | 342/368 |
| 7,106,249 | B2 * | 9/2006 | Kubo et al. ................... | 342/174 |
| 7,132,979 | B2 * | 11/2006 | Langenberg ................. | 342/368 |
| 7,248,216 | B2 * | 7/2007 | Akiyama et al. ............. | 342/368 |
| 8,212,716 | B2 * | 7/2012 | Goshen et al. ............... | 342/169 |
| 8,441,966 | B2 * | 5/2013 | Kenington et al. ........... | 370/282 |
| 8,593,337 | B2 * | 11/2013 | Ookawa ...................... | 342/174 |
| 2002/0171583 | A1 | 11/2002 | Purdy et al. | |
| 2013/0260844 | A1 | 10/2013 | Rucki et al. | |

FOREIGN PATENT DOCUMENTS

| | | |
|---|---|---|
| EP | 0812027 A2 | 12/1997 |
| EP | 2159874 A1 | 3/2010 |

\* cited by examiner

*Primary Examiner* — Pablo Tran
(74) *Attorney, Agent, or Firm* — Capitol Patent & Trademark Law Firm, PLLC

(57) ABSTRACT

Antenna array calibration systems and related methods include or utilize a plurality of signal splitter/combiner networks. Each of the signal splitter/combiner networks has a calibration signal sampling point in electrical communication with a signal input point, and signal output points. Each calibration signal sampling point may be capacitively coupled to a respective calibration source input of a calibration network. The signal splitter/combiner networks may be formed as phase-shifting networks.

20 Claims, 4 Drawing Sheets

METHODS AND SYSTEMS FOR CALIBRATING LTE ANTENNA SYSTEMS

INTRODUCTION

In "arrayed" antenna structures, a plurality of antenna elements is arranged in an array configuration. Among arrayed antenna structures, multi-column array antennas provide certain advantages in communications between a base station and a mobile wireless device. In a basic multi-column array antenna architecture, multiple columns of antenna elements are provided, wherein each column includes a plurality of antenna elements driven by a single transceiver, and each of the columns is driven by a separate transceiver.

Typically, some degree of amplitude and/or phase errors is introduced into an antenna array due to undesirable variations between each of the signal paths among the columns. Hence, arrangements may be provided to adjust each transceiver path whereby amplitude and phase adjustments of the signals may be made. A calibration network is typically incorporated into such an antenna structure to provide a feedback or calibration signal that may be used to correct or optimize antenna configuration and operation.

Referring to FIG. 4, a conventional multi-column antenna architecture is shown in part, illustrating a conventional calibration network arrangement. As shown, a calibration network 400 is configured for an eight-column antenna array. Hence, the calibration network 400 includes eight signal paths 411 connected between an input connector 412 and an output connector 414, wherein each input connector 412 is connected to a transceiver, and each output connector 414 is connected to an associated antenna column array. In the architecture shown, each of the output connectors 414 is connected to a signal splitter 416, to which the antenna elements 418 of a column antenna array are connected.

Calibration network 400 may be formed on a printed circuit board 420 or otherwise, and may include one or more signal couplers 422, each coupler within a signal path 411. The signal couplers 422 may be connected to a signal combining network whereby a transmit/receive signal of each of the columns is sampled by the signal couplers 422, and the sampled signals are combined to produce a calibration signal at calibration port 424.

In this arrangement, the calibration network 400 is configured in-line between the signal source (transceivers) and antenna array. As such, while the calibration network 400 is provides calibration and tuning functions for the antenna array, it also creates undesirable insertion losses, and introduces amplitude and phase errors due to the use, or insertion, of additional circuit, printed circuit traces, solder joints, connectors and the like inserted into the signal paths, and may also increase passive intermodulation (PIM) effects.

Accordingly, a calibration network configuration which reduces the introduction of errors into signal paths is desirable.

SUMMARY

In accordance with embodiments of the invention, a calibration network is provided in a multi-column antenna array wherein the calibration network is removed from in-line path(s) between a signal source and antenna elements of the antenna array, thereby reducing insertion loss, amplitude and phase errors and PIM effects.

In one embodiment, a plurality of signal splitter/combiner networks are provided, wherein each of the signal splitter/combiner networks forms a signal input point and a plurality of signal output points. A calibration network may also be provided, comprising a signal combining network forming a plurality of calibration source inputs and a calibration signal output, wherein RF signals applied to each of the inputs are combined by the signal combining network into a calibration signal at the calibration signal output. Each of the signal splitter/combiner networks may comprise a calibration signal sampling point in electrical communication with the signal input point, and the signal output points. Each of the calibration signal sampling points may be coupled to a respective calibration source input of the calibration network.

In certain embodiments, each of the calibration signal sampling points may be capacitively coupled to its respective calibration source input. Additional embodiments may further comprise a plurality of calibration signal transmission lines, wherein each of the calibration signal transmission lines comprises a first end connected to one of said calibration source inputs and a second end capacitively coupled to a corresponding one of said signal splitter/combiner networks.

In yet other embodiments, each signal splitter/combiner network may comprise a capacitive coupling disposed in electrical connection with the calibration signal sampling point, wherein each calibration signal sampling point is coupled to a respective calibration source input of the calibration network via a capacitive coupling. In such embodiments, the capacitive coupling may comprise a transmission line conductive path formed on or above a circuit board, and an air-gap disposed proximate to the transmission line conductive path and configured to receive a conductor of a calibration signal transmission line in communication with the calibration network.

Still further, exemplary calibration networks may further comprise a phase adjusting element, an amplitude adjusting element, or both phase and amplitude adjusting elements associated with each of the inputs.

In certain embodiments, the signal splitter/combiner networks may be embodied as phase-shifting network.

The embodiments described above may further be combined with a plurality of antenna elements arranged in an array having at least two columns, each column having a plurality of antenna elements, as well as with an RF transceiver associated with each signal splitter/combiner network. Each RF transceiver may be connected to a signal input point of an associated signal splitter/combiner network whereby each RF transceiver is accordingly associated with one of the columns.

In addition to the systems and networks described above and herein the present invention also provides related methods. For example, in one embodiment a method for calibrating an antenna system comprises: forming a plurality of signal splitter/combiner networks, each of the signal splitter/combiner networks forming a signal input point and a plurality of signal output points; forming a calibration network having a signal combining network forming a plurality of calibration source inputs and a calibration signal output, combining RF signals applied to each of the inputs by the signal combining network into a calibration signal at the calibration signal output, wherein each of the signal splitter/combiner networks has a calibration signal sampling point in electrical communication with said signal input point and said signal output points, and coupling each calibration signal sampling point to a respective calibration source input of the calibration network.

In further embodiments such a method may further comprise: capacitively coupling each calibration signal sampling point to a respective calibration source input; and/or capacitively coupling each of said signal splitter/combiner networks to said calibration signal sampling point, and coupling each calibration signal sampling point to a respective calibration source input of the calibration network; and/or forming a transmission line conductive path on or above a circuit board, disposing an air-gap proximate to said transmission line conductive path and configured to receive a conductor of a calibration signal transmission line in communication with said calibration network.

In alternative embodiments a calibration network may further comprise an amplitude adjusting element and a phase adjusting element associated with each of said source inputs, and the plurality of signal splitter/combiner networks may comprise at least one phase-shifting network.

These and other features, aspects, and advantages of the present invention will become better understood with regard to the following description, appended claims, and accompanying drawings.

DETAILED DESCRIPTION, INCLUDING EXAMPLES

Figure 1:
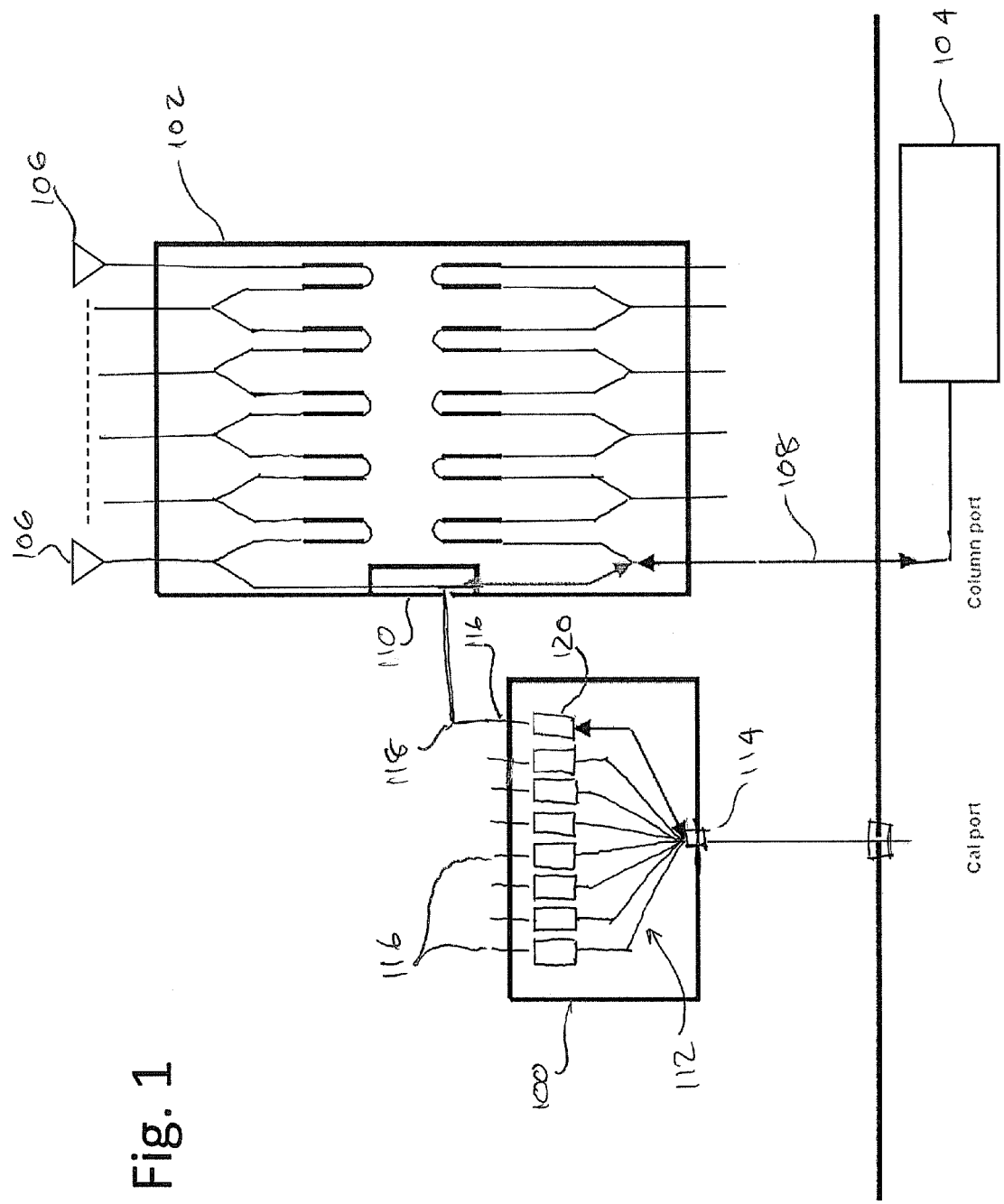
FIG. 1 is a schematic diagram of a calibration network arranged within a multi-column antenna array according to an embodiment of the present invention.
Figure 4:
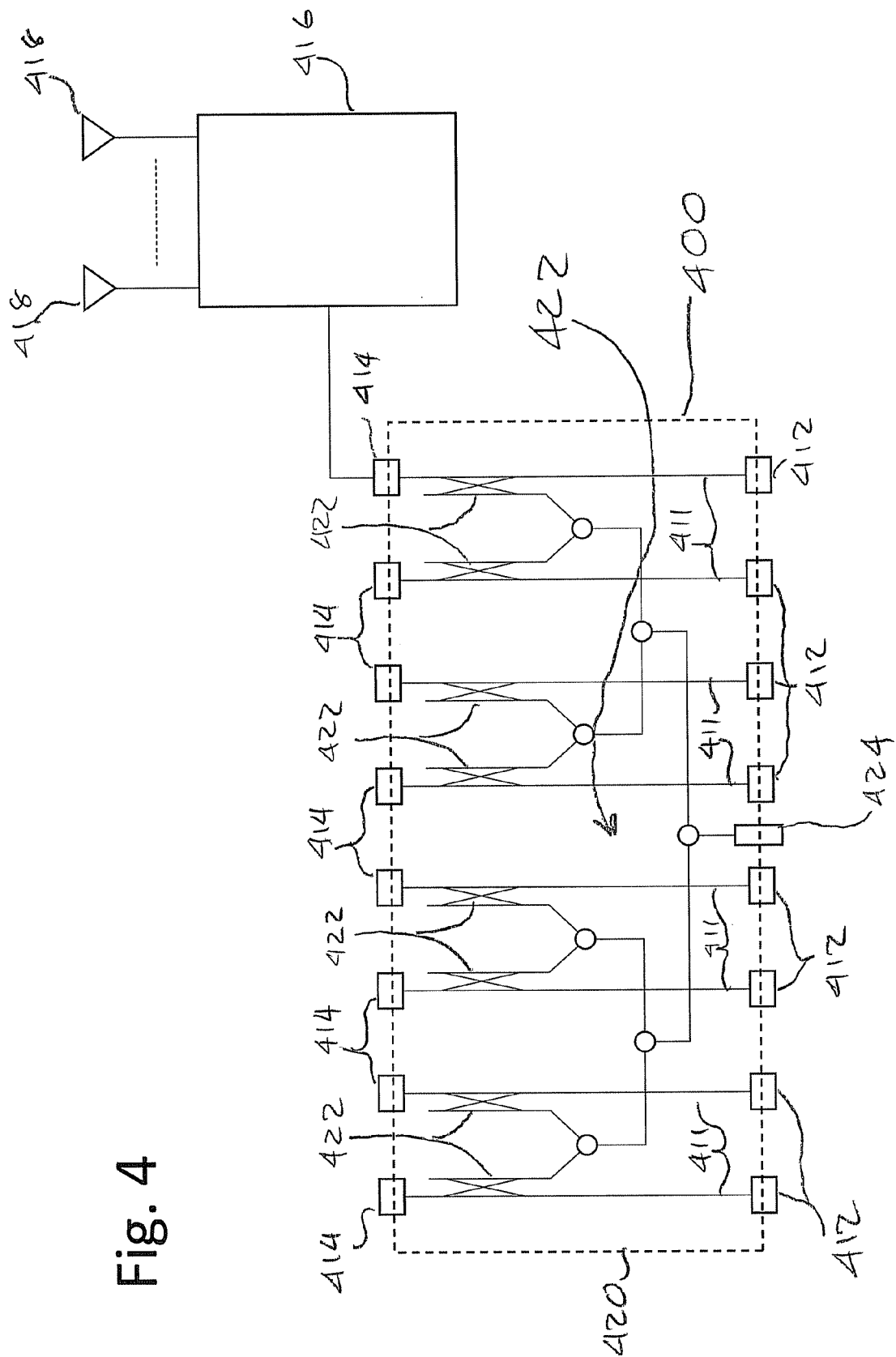
FIG. 4 is a schematic diagram of a conventional configuration of a calibration network within a multi-column antenna array.

Referring to FIG. 1, there is depicted an arrangement of a calibration network 100 within a multi-column antenna array used, for example, as a part of an antenna system within a long term evolution (LTE) network according to an embodiment of the present invention. It can be seen that, in contrast to the conventional architecture described in FIG. 4, the calibration network 100 is removed from an in-line position.

In the illustrated embodiment, a plurality of signal splitter/combiner networks are provided in conjunction with each of a plurality of column antenna arrays, each providing 1-N/N-1 connectivity between a transceiver signal source 104 and the antenna elements 106 of a column antenna array. In the illustrated embodiment, the signal splitter/combiner networks are embodied as phase-shifting networks 102 which provide, in addition to a signal splitter/combiner function, a phase-shifting function, achieved by inclusion of phase shifting or "line stretcher" elements within a signal splitter/combiner.

In one possible embodiment of a phase-shifting network 102, a plurality of phase shifting circuit elements may be arranged serially to form a power divider or signal splitter network, distributing an RF signal applied to an input point to a multi-element antenna array. The multi-element antenna array may be, for example, a column array within a multi-column array architecture.

The phase shifting circuit elements themselves may include a first element formed on a circuit board, having an elongated electrically conductive path formed on a surface of the circuit board and a capacitive cover disposed over and electrically connected to the conductive path, defining an elongated receiving space there between. A second element may be an electrically conductive tuning member slidably receivable within the receiving space, and capacitively coupled to the first element. Slidably positioning the tuning member within the receiving space effects a phase shift or line stretching adjustment of a signal traversing the circuit element. One example of such a phase-shifting network is described in U.S. patent application Ser. No. 13/952,197, the contents of which are incorporated by reference herein as if set forth in full herein.

Referring back to FIG. 1, the calibration network 100 comprises a plurality of calibration source inputs 116, a signal combiner network 112 and a calibration signal output 114. Each of the calibration source inputs 116 may be connected to a corresponding one of the phase-shifting networks 102. More particularly, a calibration signal transmission line 118 or other means for signal communication may be connected between each of the calibration source inputs 116 and the corresponding phase-shifting network 102 so that an RF signal (for example) from the phase-shifting network 102 is received at the calibration source input 116.

Figure 2:
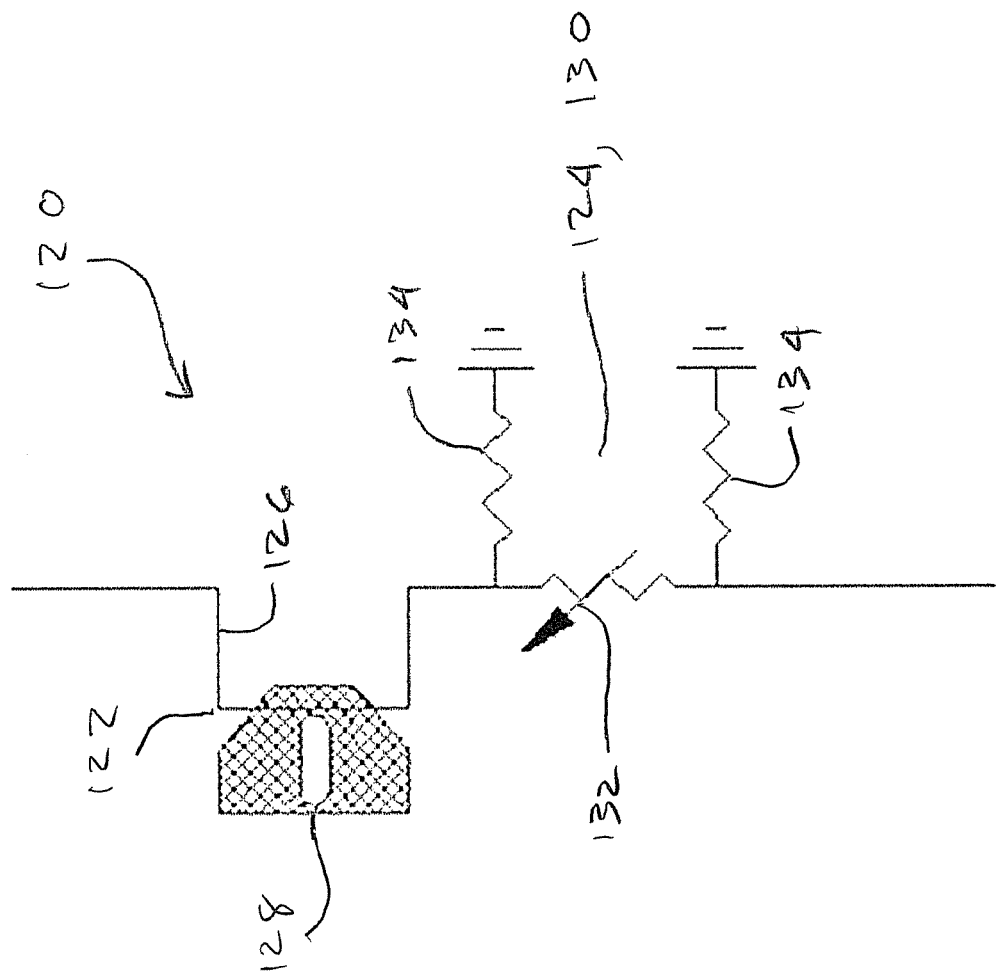
FIG. 2 is a schematic diagram of a phase and amplitude adjusting circuit in a calibration network according to an embodiment of the present invention.

A phase and amplitude adjusting circuit 120 may be associated with each calibration source input 116, prior to connection of the signal input to the signal splitter/combiner network 112. Alternatively, the phase and amplitude adjusting circuit 120 may be replaced with a phase only, or amplitude only, adjusting circuit. Considering the phase and amplitude adjusting circuits 120 in greater detail, with reference to FIG. 2, each phase and amplitude adjusting circuit 120 may comprise a phase adjusting element 122, and an amplitude adjusting element 124. The phase adjusting element 122 may be formed on a circuit board as a "line stretcher", for example, comprising a length of a circuit trace 126 overlaid by a movable dielectric element 128. The amplitude adjusting element 124 may comprise an adjustable Pi attenuator 130 which conventionally comprises a variable resistor 132 arranged together with a pair of resistors 134.

Returning to FIG. 1, a primary signal transmission line 108 may connect a phase-shifting network 102 to a corresponding transceiver, providing a transmitted RF signal from the transceiver to the phase-shifting network 102, and returning a received RF signal from the column antenna elements to the transceiver.

The primary signal transmission line 108 may be connected to an electrical midpoint of a phase-shifting network 102. Additionally, an electromagnetic or capacitive (non-contact) coupling 110 may be provided in the phase-shifting network 102, also at the electrical midpoint of the phase-shifting network 102, to provide a signal sampling point to feed a signal sample to the calibration network 100.

Figure 3:
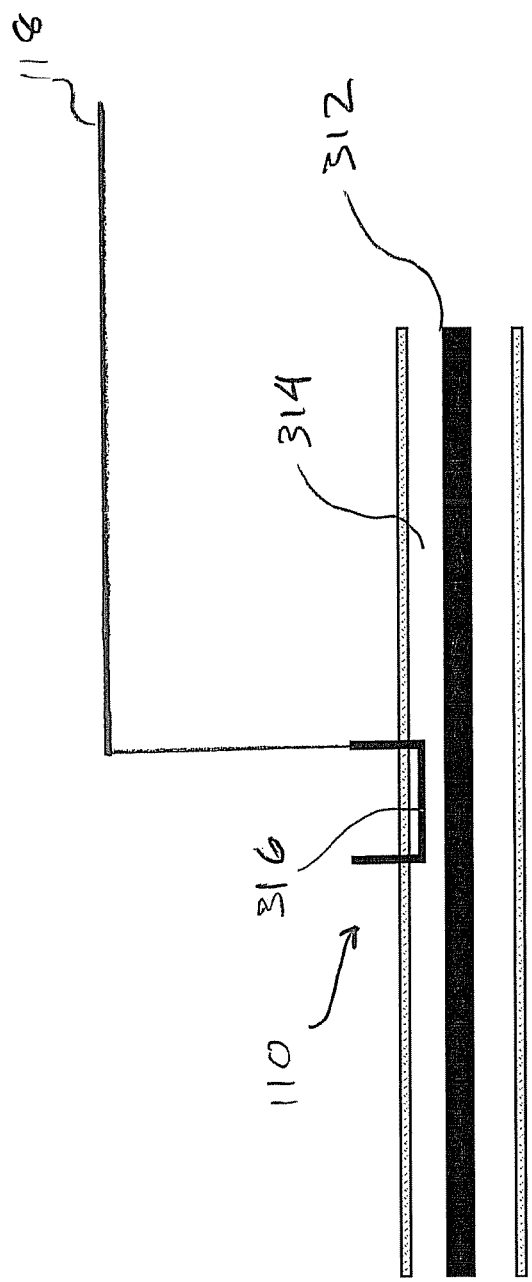
FIG. 3 is a diagram of an electromagnetic or capacitive coupling element in a phase shifting network according to an embodiment of the present invention.

Referring to FIG. 3, one arrangement of an electromagnetic or capacitive coupling 110 is shown. A transmission line conductive path 312 may be formed on or above circuit board, and typically proximate to, or between, ground planes. A space or air-gap 314 may be configured to receive a coupling element 316 in electrical communication with the calibration signal transmission line 118. The coupling element 316 may be disposed proximate to the conductive path 312, but not in electrical contact. One or the other, or both, of the conductive path 312 and the conductor 316 may be coated with an insulator or dielectric material, or these elements may be simply separated by an air-gap, for example.

Returning again to FIG. 1, and considering the described system overall, an RF signal generated by a transceiver may be conveyed via primary signal transmission line 108 to an associated phase-shifting network 102, where the signal may be divided and distributed to the column antenna elements connected to phase-shifting network 102. Also, a signal sample may be communicated to the calibration network 100 by a calibration signal transmission line 118, wherein the signal sample is transmitted to the calibration signal transmission line 118 via the capacitive coupling 110. Signal samples received at the calibration source input 116 of the calibration network 100 are combined by the signal splitter/combiner network 112 to produce a calibration signal, at the calibration signal output 114.

Because the calibration network 100 is capacitively coupled to the phase shift networks 102, and not disposed inline with respect to the transceiver signal sources 104 and the phase shift networks 102, and because each of the phase shift networks 102 is directly connected to a corresponding signal source 104, a reduction in insertion loss, amplitude and phase errors and PIM effects associated with the calibration network 100 may be realized.

It will be understood that the above-described embodiments of the invention are illustrative in nature, and that modifications to such embodiments may occur to those skilled in the art without departing from the scope and spirit of the invention as defined by the appended claims. Accordingly, the invention is not to be regarded as limited to the embodiments disclosed herein. Instead, the scope of the present invention is as set forth in the appended claims.

What is claimed is:

1. An antenna array calibration system, comprising:
a plurality of signal splitter/combiner networks, each of the signal splitter/combiner networks forming a signal input point and a plurality of signal output points;
a calibration network having a signal combining network forming a plurality of calibration source inputs and a calibration signal output, wherein RF signals applied to each of the inputs are combined by the signal combining network into a calibration signal at the calibration signal output, and
wherein each of the signal splitter/combiner networks has a calibration signal sampling point in electrical communication with said signal input point and said signal output points, and wherein each calibration signal sampling point is coupled to a respective calibration source input of the calibration network and located substantially at an electrical midpoint of the signal splitter/combiner network.

2. The antenna array calibration system of claim 1, wherein each said calibration signal sampling point is capacitively coupled to a respective calibration source input.

3. The antenna array calibration system of claim 1, further comprising a plurality of calibration signal transmission lines, wherein each of the calibration signal transmission lines comprises a first end connected to one of said calibration source inputs and a second end capacitively coupled to a corresponding one of said signal splitter/combiner networks.

4. The antenna array calibration system of claim 1, wherein each said signal splitter/combiner networks comprises a capacitive coupling disposed in electrical connection with said calibration signal sampling point, and wherein each calibration signal sampling point is coupled to a respective calibration source input of the calibration network via said capacitive coupling.

5. The antenna array calibration system of claim 4, wherein said capacitive coupling comprises a transmission line conductive path formed on or above a circuit board, and an air-gap disposed proximate to said transmission line conductive path and configured to receive a conductor of a calibration signal transmission line in communication with said calibration network.

6. The antenna array calibration system of claim 1, wherein said calibration network further comprises a phase adjusting element associated with each of said inputs.

7. The antenna array calibration system of claim 1, wherein said calibration network further comprises an amplitude adjusting element associated with each of said inputs.

8. The antenna array calibration system of claim 1, wherein said plurality of signal splitter/combiner networks comprises at least one phase-shifting network.

9. An antenna array system, comprising:
a plurality of antenna elements arranged in an array having at least two columns, each column having a plurality of antenna elements;
a signal splitter/combiner network associated with each of said columns, each of the signal splitter/combiner networks forming a signal input point and a plurality of signal output points connected to respective antenna elements of said associated column;
an RF transceiver associated with each of said signal splitter/combiner networks, each RF transceiver being connected to the signal input point of said associated signal splitter/combiner networks whereby each RF transceiver is further associated with one of said columns;
a calibration network having a signal combining network defining a plurality of calibration source inputs and a calibration signal output, wherein RF signals applied to each of the inputs are combined by the signal combining network into a calibration signal at the calibration signal output, and wherein an amplitude adjusting element and a phase adjusting element are associated with each of said calibration source inputs, and
wherein each of the signal splitter/combiner networks has a calibration signal sampling point in electrical communication with said signal input point and said signal output points, and wherein each calibration signal sampling point is coupled to a respective calibration source input of the calibration network, and located substantially at an electrical midpoint of the signal splitter/combiner network.

10. The antenna array system of claim 9, wherein each said calibration signal sampling point is capacitively coupled to its respective calibration source input.

11. The antenna array system of claim 9, further comprising a plurality of calibration signal transmission lines, wherein each of the calibration signal transmission lines comprises a first end connected to one of said calibration source inputs and a second end capacitively coupled to a corresponding one of said signal splitter/combiner networks.

12. The antenna array system of claim 9, wherein each said signal splitter/combiner networks comprises a capacitive coupling disposed in electrical connection with said calibration signal sampling point, and wherein each calibration signal sampling point is coupled to a respective calibration source input of the calibration network via said capacitive coupling.

13. The antenna array system of claim 12, wherein said capacitive coupling comprises a transmission line conductive path formed on or above a circuit board, and an air-gap disposed proximate to said transmission line conductive path and configured to receive a conductor of a calibration signal transmission line in communication with said calibration network.

14. The antenna array system of claim 9, wherein said plurality of signal splitter/combiner networks comprises at least one phase-shifting network.

15. A method for calibrating an antenna system, comprising:

forming a plurality of signal splitter/combiner networks, each of the signal splitter/combiner networks forming a signal input point and a plurality of signal output points;

forming a calibration network having a signal combining network forming a plurality of calibration source inputs and a calibration signal output, combining RF signals applied to each of the inputs by the signal combining network into a calibration signal at the calibration signal output, wherein each of the signal splitter/combiner networks has a calibration signal sampling point in electrical communication with said signal input point and said signal output points and located substantially at an electrical midpoint of the signal splitter/combiner network, and coupling each calibration signal sampling point to a respective calibration source input of the calibration network.

16. The method as in claim 15 further comprising capacitively coupling each calibration signal sampling point to a respective calibration source input.

17. The method as in claim 15 further comprising capacitively coupling each of said signal splitter/combiner networks to said calibration signal sampling point, and coupling each calibration signal sampling point to a respective calibration source input of the calibration network.

18. The method as in claim 17 comprising forming a transmission line conductive path on or above a circuit board, disposing an air-gap proximate to said transmission line conductive path and configured to receive a conductor of a calibration signal transmission line in communication with said calibration network.

19. The method as in claim 15, wherein said calibration network further comprises an amplitude adjusting element and a phase adjusting element associated with each of said source inputs.

20. The method as in claim 15, wherein said plurality of signal splitter/combiner networks comprises at least one phase-shifting network.

\* \* \* \* \*